US012705143B2

(12) United States Patent
Strogov et al.

(10) Patent No.: US 12,705,143 B2
(45) Date of Patent: Aug. 11, 2026

(54) SYSTEMS AND METHODS FOR CLOUD-INTEGRATED PERSISTENT FILE PROTECTION IN ENDPOINT DETECTION AND RESPONSE

(71) Applicant: Acronis International GmbH, Schaffhausen (CH)

(72) Inventors: Vladimir Strogov, Singapore (SG); Aliaksei Dodz, Singapore (SG); Serg Bell, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 56 days.

(21) Appl. No.: 18/988,033

(22) Filed: Dec. 19, 2024

(65) Prior Publication Data

US 2026/0178449 A1 Jun. 25, 2026

(51) Int. Cl.
*G06F 16/13* (2019.01)
*G06F 11/1446* (2026.01)

(52) U.S. Cl.
CPC ...... *G06F 11/1464* (2013.01); *G06F 11/1451* (2013.01); *G06F 16/137* (2019.01)

(58) Field of Classification Search
CPC . G06F 11/1464; G06F 11/1451; G06F 16/137
USPC .......................................................... 707/674
See application file for complete search history.

(56) References Cited

U.S. PATENT DOCUMENTS

| | | | |
|---|---|---|---|
| 11,010,470 B2 | 5/2021 | Animireddygari et al. | |
| 2018/0285282 A1* | 10/2018 | Jakowski | G06F 12/0811 |
| 2019/0129802 A1 | 5/2019 | Laier et al. | |
| 2021/0357364 A1* | 11/2021 | Saliba | G06F 21/565 |
| 2023/0205639 A1* | 6/2023 | Yadav | G06F 11/1446 707/645 |
| 2024/0045964 A1* | 2/2024 | Bednash | G06F 21/566 |
| 2024/0176783 A1* | 5/2024 | Crofton | H04L 67/1095 |
| 2025/0217782 A1* | 7/2025 | Moir | G06Q 20/0655 |

FOREIGN PATENT DOCUMENTS

CN 104899161 A 9/2015

* cited by examiner

*Primary Examiner* — Amy Ng
*Assistant Examiner* — Antonio J Caiado
(74) *Attorney, Agent, or Firm* — ESPE Legal Consultancy FZ-LLC

(57) ABSTRACT

Systems and methods of persistent file protection integrate cloud-based backups with EDR file protection. Use of local persistent file cache (PFC) data with cloud-stored file segments, facilitates reconstruction of file states from multiple sources. File storage and retrieval efficiency are optimized, even when local session caches are invalidated or when extensive file modifications exceed storage quotas.

20 Claims, 4 Drawing Sheets

Archive Verifier 140

Archive Mounting Service 142

Archive API 144

Archive Mount Driver 146

Cloud Archive 150

Backup Archives 158

Extent comparison and validation

Disk 160

Virtual Disk 162

Network 170

Backup Slices 180

Computing Device Under Active Protection 104

Backup Module 106

SYSTEMS AND METHODS FOR CLOUD-INTEGRATED PERSISTENT FILE PROTECTION IN ENDPOINT DETECTION AND RESPONSE

TECHNICAL FIELD

Embodiments relate to endpoint detection and response (EDR) systems. More specifically, embodiments relate to efficient file remediation, backup management, and recovery after a system reboot or data loss event.

BACKGROUND

Traditional EDR systems are limited in their capacity to perform file recovery post-reboot, often depending solely on local storage and snapshots. As enterprises increasingly adopt cloud-based storage solutions, there is a need for EDR systems that can dynamically leverage cloud resources to improve remediation strategies, especially when local cache storage becomes insufficient or obsolete.

SUMMARY

Embodiments substantially meet the aforementioned needs of the industry. Systems and methods integrate cloud-based backups with EDR file protection. In an embodiment, a system utilizes local persistent file cache (PFC) data with cloud-stored file segments, facilitating reconstruction of file states from multiple sources. This approach optimizes file storage and retrieval efficiency, even when local session caches are invalidated or when extensive file modifications exceed storage quotas.

Systems and methods provide a multi-layered approach to persistent file protection. In one aspect, a persistent file cache (PFC) comprises a local storage mechanism configured to track file modifications and store validated file information across sessions.

In one aspect, an archive verifier comprises a local agent configured to access cloud-based backups, retrieve backup slices, and verify file extents through hash and topology comparisons. A file "extent" refers to a contiguous sequence of disk blocks allocated to a file for storing a portion of its data. The archive verifier can act as an intermediary between local storage and cloud backups. The archive verifier can dynamically mount cloud-stored disk images (called "slices") using a virtual mounter tool, providing fast and reliable reconstruction of file states.

In one aspect, the system utilizes an archive verifier that interfaces between a local EDR system and cloud storage services. The archive verifier identifies relevant backup slices from cloud backups and mounts the relevant backup slices as local volumes using a virtual mounter tool. Embodiments can validate the file extents resulting from the local volumes using hash comparisons to ensure they match pre-incident versions stored in the PFC. In one aspect, a virtual mounter tool comprises a service driver that mounts cloud file segments as local volumes, allowing for seamless integration with existing file protection architecture.

An archive represents a comprehensive backup of a system's state at a particular point in time. Each archive is divided into a series of slices, where each slice corresponds to a snapshot of the system state at a specific time. These slices, akin to segments of a larger file, enable efficient management and restoration of data. For example, a slice can be dynamically mounted as a virtual disk, allowing the file system to recognize and interact with its contents without requiring specialized parsers. This approach treats slices as sets of sectors that can be accessed on demand or immediately.

Slicing supports differential recovery by allowing individual slices to store snapshots incrementally. Instead of storing redundant data, only the changes between snapshots are recorded. This results in significant storage efficiency and faster restoration times. By maintaining references to previous slices in the PFC, the system avoids duplicating data unnecessarily, leveraging a copy-on-write mechanism to expedite backup creation.

One key advantage of slicing architecture is scalability. The system can maintain an unlimited number of slices in the cloud, providing robust data protection without the constraints of local storage limitations. This ensures that historical data remains accessible for extended periods, granting EDR analysts the freedom to conduct thorough investigations without the risk of data loss.

In a feature and advantage of embodiments, systems and methods implement a differential recovery process when the local PFC's quota is exceeded or if critical file segments have been overwritten or invalidated. For example, the archive verifier accesses the most recent valid backup slice from the cloud (e.g. from a plurality of slices from a most recent archive), mounts the most recent valid backup slice, and identifies the required file extents. The archive verifier compares these cloud-stored extents with hashes stored in the PFC. If a match is found, embodiments integrate the extent with the PFC data to restore the file. As a result, only necessary file segments are retrieved, which minimizes data transfer. Further, quicker recovery is provided by comparing PFC data and cloud-stored segments using hash validations.

In another feature and advantage of embodiments, improved file integrity checking is provided. For example, embodiments implement a method for validating file extents from cloud backups using the PFC, which tracks file changes and validates segments. In one aspect, embodiments compare local extents with cloud extents using hash checks, ensuring that the recovered files match pre-incident versions. In one aspect, a differential recovery process based on such an extent analysis reduces restoration time by selectively restoring unaltered file portions.

Embodiments therefore improve cloud-based storage for EDR systems. Specifically, slice-based differential recovery is implemented using local and cloud resources. Such a cloud-integrated approach improves EDR systems by allowing operation beyond the limitations of local storage, making EDR systems resilient to extensive data changes or local storage constraints. Furthermore, such a cloud-integrated approach allows recovery actions based on multiple backup points, including selection of the most recent valid backup available before the incident, thereby ensuring accurate restoration. In one aspect, by utilizing local and cloud resources, embodiments efficiently handle scenarios where files are partially deleted or corrupted. Even if a file is removed from the local volume, the file structure can be reconstituted using cloud resources, providing continuity and minimizing data loss risks.

Another benefit is the ability to efficiently operate with hash-based identifiers and metadata stored in the PFC. By referencing hashes instead of actual data, the system can minimize dedicated storage necessary for remediation and local storage usage while maintaining comprehensive backup information in the cloud. This separation of metadata from actual data storage ensures both efficiency and reliability. Moreover, analysts are provided with confidence in their ability to access necessary data at any time without concerns about data integrity or availability.

In another feature and advantage of embodiments, embodiments can perform differential restoration. Rather than retrieving entire files from cloud storage, embodiments can select only the extents necessary for reconstruction, combining such selected extents with unmodified original extents on local storage and valid data retained in the local PFC. This differential approach reduces data transfer and minimizes restoration times, improving resilience and performance.

In an embodiment, a system for persistent file protection for an incident for a file comprises a persistent file cache (PFC) configured to track file changes and store validated pre-incident file information across system restart, the validated pre-incident file information including a pre-incident file extent hash; a memory and at least one processor operably coupled to the memory; and instructions that, when executed by the at least one processor, cause the at least one processor to implement: an archive verifier configured to: access a cloud-based backup archive and retrieve recent backup slices from the cloud-based backup archive, mount a last backup slice before the incident from the recent backup slices as a local volume using an archive mount driver, determine at least one file extent from the local volume, hash the at least one file extent, and compare the hash of the at least one file extent to the pre-incident file extent hash to identify matching extents between the last backup slice and the pre-incident file, a remediation handler configured to reconstruct the file as a reconstructed file by combining unaltered file extents retrieved from the local volume with extents stored in the PFC or validated extents from the backup slices from the cloud-based backup archive.

In an embodiment, a method of persistent file protection for an incident for a file using a persistent file cache (PFC) configured to track file changes and store validated pre-incident file information across system restart, the validated pre-incident file information including a pre-incident file extent hash, the method comprising: retrieving a plurality of backup slices from a most recent cloud-based backup archive; mounting a last backup slice before the incident from the plurality of backup slices as a local volume; determining at least one file extent from the local volume; hashing the at least one file extent; comparing the hash of the at least one file extent to the pre-incident file extent hash to identify matching extents between the last backup slice and the pre-incident file; and reconstructing the file as a reconstructed file using the pre-incident file information by combining unaltered file extents retrieved from the local volume with extents stored in PFC or validated extents from the plurality of backup slices.

In an embodiment, a system for persistent file protection comprises a cloud-based backup device comprising storage for a plurality of backup slices for a computing device backup; kernel-mode computing device instructions that, when executed by at least one processor, cause the kernel-mode computing device instructions to: retrieve a plurality of backup slices from a most recent cloud-based backup archive, mount a last backup slice before the incident from the plurality of backup slices as a local volume, determine at least one file extent from the local volume, hash the at least one file extent, compare the hash of the at least one file extent to a pre-incident file extent hash to identify matching extents between the last backup slice and the pre-incident file; and user-mode computing device instructions that, when executed when executed by at least one processor, cause the user-mode computing device instructions to: reconstruct the file as a reconstructed file using by combining unaltered file extents retrieved from the local volume with extents stored in PFC or validated extents from the plurality of backup slices from the most recent cloud-based backup archive.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
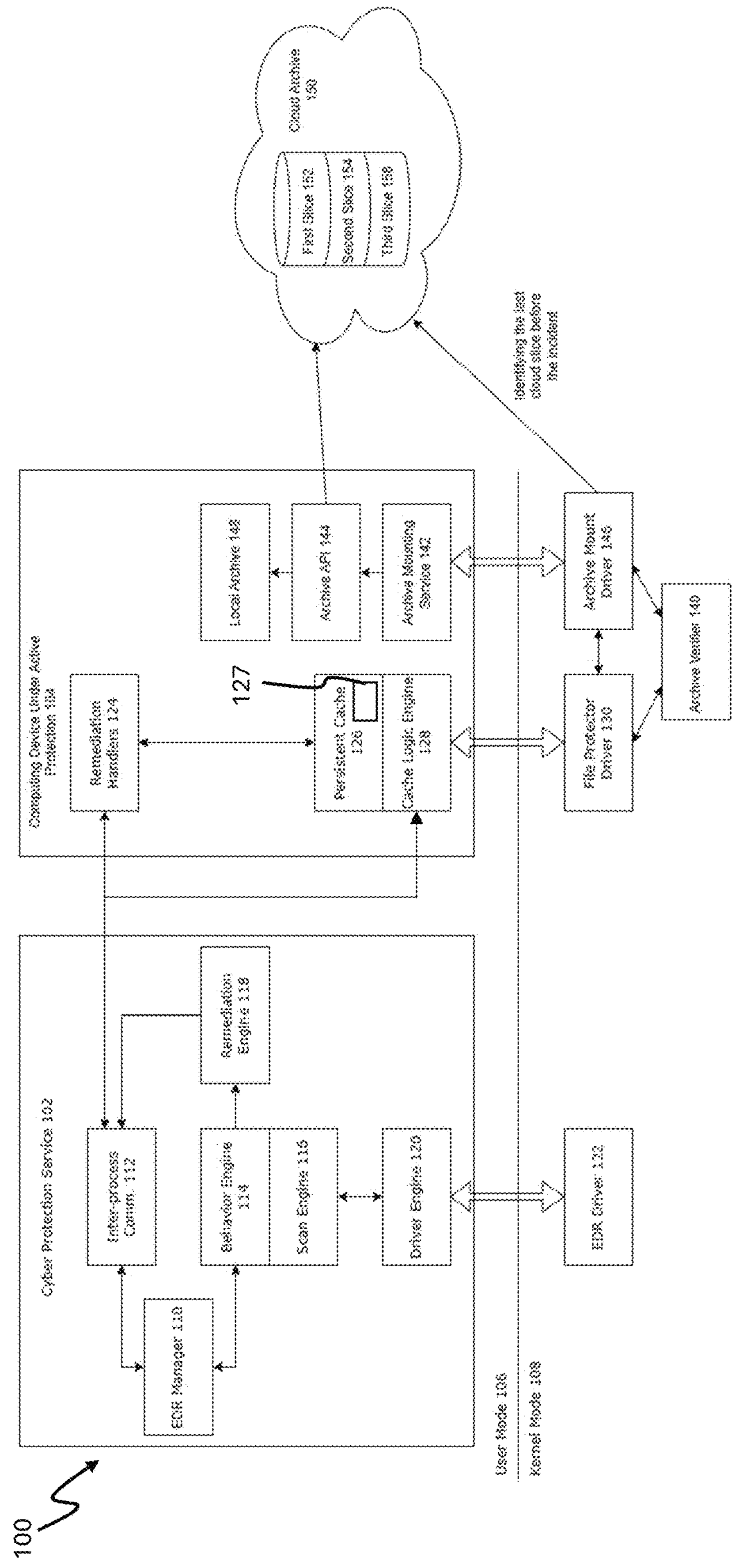
FIG. 1 is a block diagram of a system for persistent file protection, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Systems and methods implement hash-based validation and slice mounting. For example, a persistent file cache (PFC) can store the most recent valid information about file extents, while cloud archives store backup slices. System and methods are configured to mount the last slice before an incident from the cloud and compare file extent's hash with the extent's hash stored in the PFC. As a result, the retrieved data from the cloud is ensured to be accurate, and only valid data is taken from the cloud slice. If the hashes match, the data is pulled from the mounted cloud slice. In contrast to existing systems and methods, embodiments can compare cloud file extents to the PFC directly.

System and methods implement post-reboot efficiency. For example, the PFC can selectively store information about file extents and slices from the cloud archive. In particular, the PFC thus reflects the state of extents in the cloud slices, allowing for faster validation after a system reboot.

Without this, mounting the cloud archive and comparing data immediately after a reboot is slow and affects system performance. The PFC thereby provides a shortcut, enabling quicker validation before fully loading data from the cloud. As a result, the PFC acts as a temporary but critical storage area, allowing systems and methods to continue tracking files efficiently after a reboot without incurring the overhead of fully remounting cloud archives.

Systems and methods implement two-step validation that optimizes performance. Initially, systems and methods can assume the tracking of a file can continue based on local PFC data. During this period, the system continues operating normally (first step). In the background, the system can mount the necessary cloud slices to validate the extents of the file. If there is a mismatch or an invalidation, the system adjusts its tracking based on this new validation (second step). As a result, performance is not degraded during the validation phase, as the system does not block operations while waiting for cloud slices to mount.

Systems and methods implement differential recovery focused on extents. For example, instead of retrieving full files from the cloud archive, systems and methods utilize differential recovery. In one aspect, only specific file extents that are missing or invalid locally are fetched from the cloud. An archive verifier is configured for comparing extents between the local system and the cloud archive. By verifying each extent through hash-based comparisons, systems and methods ensure the integrity of the recovered data. As a result, unnecessary data transfer is minimized and allows for quicker, more efficient file recovery.

Systems and methods implement quota management and file deletion. For example, when file quota limits are exceeded, the system can identify which data to delete from the PFC. The data that has already been saved in the cloud slices can be safely deleted from local cache. Further, systems and methods also track where deleted data is stored in the cloud slices, confirming that it can be retrieved later if necessary. As a result, systems and methods prevent losing track of critical data after it has been deleted locally due to quota limits.

Systems and methods implement strategic component implementation and interaction. For example, an archive verifier interacts with a file protector driver to initiate validation events and track file changes. An archive mounting service and archive mount driver handle the actual mounting of the cloud slices, while the archive verifier confirms the validity of the extents through hash checks. Notifications about file deletions or other changes are triggered by a file protector driver, which can either request data from the PFC or mount cloud slices to retrieve the necessary extents. As a result, systems and methods can dynamically validate file states and adjust tracking based on the data available locally and in the cloud.

Referring to FIG. 1, a system 100 for persistent file protection is depicted, according to an embodiment. System 100 generally comprises a cyber protection service 102 and computing device 104 under active protection by cyber protection service 102.

System 100 includes components that operate both in a user mode 106 and a kernel mode 108. In kernel mode 108, the executing code has complete and unrestricted access to the underlying hardware. Code in kernel mode 108 can execute any CPU instruction and reference any memory address. Kernel mode 108 is generally reserved for the lowest-level, most trusted functions of the operating system. In user mode 106, the executing code has no ability to directly access hardware or reference memory. Code running in user mode 106 must delegate to system APIs to access hardware or memory.

Embodiments described herein include various engines (or synonymously, "modules"), each of which is constructed, programmed, configured, or otherwise adapted, to autonomously carry out a function or set of functions. The term engine as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware.

An engine can itself be composed of sub-engines, each of which can be regarded as an engine in its own right. Moreover, in the embodiments described herein, each of the various engines corresponds to a defined functionality; however, it should be understood that in other contemplated embodiments, each functionality can be distributed to more than one engine. Likewise, in other contemplated embodiments, multiple defined functionalities can be implemented by a single engine that performs those multiple functions, possibly alongside other functions, or distributed differently among a set of engines than specifically illustrated in the examples herein. In one example, the engines described herein are executed by a processor (e.g. an ASIC) according to instructions stored on memory operably coupled to the processor.

Cyber protection service 102 generally comprises an EDR manager 110, an inter-process communication (IPC) engine 112, a behavior engine 114, a scan engine 116, a remediation engine 118, and a driver manager 120 for coordination of EDR driver 122.

EDR manager 110 is configured to process event data to identify potential security threats and suspicious activities on computing device 104. In an embodiment, EDR manager 110 can receive event data indicative of various activities of computing device 104, including process executions, registry modifications, network connections, system configuration changes, and user interactions. Event data can include telemetry data, such as logs, event records, system calls, network traffic, registry changes, and the like.

In an embodiment, EDR manager 110 utilizes persistent cache 126 to extract information for remediation purposes. For example, EDR manager 110 can request data of persistent cache 126 related to the particular remediation selected for the particular file(s) at issue, in accordance with remediation engine 118 and remediation handlers 124, using inter-process communication engine 112.

IPC module 112 comprises a controller for external programming for EDR manager 110 that allows for external control applications such as on computing device 104. In an embodiment, IPC module 112 can communicate with computing device 104 (e.g. certain remediation handlers, as will be described) via AP_PROXY instruction.

Behavior engine 114 is configured to recognize and interpret behavioral patterns and activity sequences to identify normal activity (e.g., baseline system behavior) and deviations that may indicate potential security threats. Behavioral analysis by behavior engine 114 can involve machine learning algorithms, statistical models, and heuristics to detect suspicious or anomalous behavior. By analyzing relationships between different events and entities, behavior engine 114 allows for complex attack scenarios, lateral movement, and persistent threats to be identified.

In one aspect, behavior engine 114 is configured to analyze the behavior of software and systems to detect abnormal or suspicious activities that may indicate the presence of malware or security breaches. For example, behavior engine 114 can recognize malicious patterns of behavior indicative of predefined malware. Once a threat is identified, the threat can be remediated. In an embodiment, behavior engine 114 can command a remediation controller (e.g. remediation engine 118) via proprietary EDR_REMEDIATION_CONTROLLER instructions.

Scan engine 116 can be a scanning and rules engine configured to, for example, perform network security scanning and/or web application scanning according to certain logic rules. In some implementations, scan engine 116 can conduct comprehensive scans of network infrastructure (e.g., routers, switches, firewalls, and servers) to identify vulnerabilities, misconfigurations, and potential security risks. In some implementations, scan engine 116 can assess the security posture of web applications by scanning for common vulnerabilities, such as SQL injection, cross-site scripting (XSS), and insecure authentication mechanisms. Scan engine 116 results can be utilized by behavior engine 114.

Remediation engine 118 is a remediation controller configured to implement response actions. For example, remediation engine 118 facilitates response actions to mitigate security incidents and contain threats on the endpoint. Depending on the severity of the threat and the organization's security policies, response actions may include isolating the endpoint from the network, terminating malicious processes, quarantining files, rolling back system changes, and/or alerting security operations personnel for further investigation and remediation. In an embodiment, remediation controller 118 can communicate with IPC module 112 (for further interaction with computing device 104) via AP_PROXY instruction.

Driver engine 120 is a driver manager configured to support EDR service workflow and execution of cyber protection service 102 (e.g., by instructing and receiving data from EDR driver 122).

EDR driver 122 is an agent deployed to monitor and analyze system activities in real-time. EDR driver 122 operates at a foundational level within the operating system, allowing it to capture and interpret events, processes, network connections, file operations, and other activities occurring on computing device 104. For example, EDR driver 122 is configured to monitor operations and functions that interact directly with hardware resources of computing device 104.

In an embodiment, EDR driver 122 is a device driver configured to communicate through a computer bus or communication subsystem connected to hardware of computing device 104. In such embodiments, EDR driver 122 can be hardware dependent and operating-system specific. For example, EDR driver 122 can provide abstraction by acting as a translator between computing device 104 and higher-level applications. The presence of EDR driver 122 between the hardware and application levels can allow for more granular monitoring and control of system activities, providing a higher level of security and responsiveness. For example, EDR driver 122 can implement kernel-level file system hooks, network stack integration, and memory scanners.

In an embodiment, EDR driver 122 is a software driver configured to provide a programming interface to control and manage specific lower-level interfaces that are often linked to a specific type of hardware, or other low-level service. EDR driver 122 is configured to capture data, according to embodiments. EDR driver 122 can send captured data to cyber protection service 102 via driver engine 120.

Computing device 104 generally comprises remediation handlers 124, persistent cache 126, cache logic engine 128, archive mounting service 142, archive API 144, and local archive 148. As illustrated in FIG. 1, computing device 104 further operates in coordination with file protector driver 130, archive verifier 140, and archive mount driver 146 and cloud archive 150.

Remediation handlers 124 implement the specific remediation defined by remediation engine 118. In an embodiment, remediation handlers 124 are configured for the particular computing operations defined by a particular remediation. For example, in remediation including isolating the endpoint from the network, remediation handlers 124 can be configured with network I/O access and port blocking or disabling capability. In another example, in remediation including terminating malicious processes, remediation handlers 124 can be configured with file system permissions to kill or disable the process. In another example, in remediation including quarantining files, remediation handlers 124 can be configured for defining a quarantine, such as a computing hardware or software location and file system permissions to place the particular file in the defined location. In another example, in remediation including rolling back system changes, remediation handlers 124 can be configured to access one or more system backups (e.g. via database not depicted in FIG. 1) and execute system rollback to a given backup. In another example, in remediation including alerting security operations, remediation handlers 124 can be configured with graphical user interface (GUI) components, or other I/O components, such as messaging or reporting capabilities to indicate the given alert.

In one aspect, when a file is being remediated, the file can be recreated from portions of the file left untouched on storage, plus the original portions of those that have been modified. Effectively, a file can be digitally sewn together from these portions. Advantageously, embodiments conserve storage on restoration data.

In one aspect, remediation handler 124 is configured to reconstruct the file using the pre-incident file information and the plurality of backup slices including by selectively retrieving file extents from the mounted local volume that have been modified based on the comparing of the hash of the at least one file extent to the pre-incident file hash Persistent cache 126 is data storage that is configured for storing data persistently across system restarts, ensuring that frequently accessed data remains available even after a reboot. In an embodiment, persistent cache 126 resides in user mode 106 (as illustrated in FIG. 1). In another embodiment, persistent cache 126 resides in kernel mode 108. In certain other embodiments, persistent cache 126 resides in both user mode 106 and kernel mode 108. The implementation location of persistent cache 126 can be based on particular optimization goals, such as overhead, communication, and other performance criteria.

In an embodiment, persistent cache 126 comprises a persistent file cache portion 127 which is stored persistently (referred to throughout as PFC or persistent cache portion). In one aspect, the PFC comprises historical file operation information. For example, historical file operation information can include logs of file creation, modification, and deletion events that occurred during previous system sessions. Accordingly, details such as the timestamps of these operations, the user or process responsible for the changes, and the specific attributes of the files affected (e.g., size, permissions, and location on disk) are tracked. In another example, the PFC can store historical information about file access patterns, such as which files were frequently read or written to during certain periods. This data can be valuable for detecting unusual behavior, such as a sudden increase in access to sensitive files, which might indicate a security threat. Additionally, the PFC can record metadata changes, such as alterations to file properties (e.g., renaming, attribute changes) and track the sequence of operations performed on specific files. In one aspect, persistent cache 126 comprises a session (non-persistent) cache portion that invalidates after restart of the system, and a persistent cache portion that does not invalidate after restart of the system. During a single user session, the session portion of the cache may store temporary data related to ongoing file operations, such as recently accessed files, active network connections, or in-progress file transfers. This data is important for improving performance during that session, allowing the system to quickly retrieve and process information without having to repeatedly access the underlying storage. Meanwhile, the persistent portion of the cache can store critical data that needs to survive across system restarts, such as logs of file modifications, security policies, or metadata changes. For instance, if a file was modified just before a system restart, the persistent cache retains information about that modification, ensuring that the system can detect and respond to the change when it comes back online. The session and persistent portions can work together when, for example, a user modifies a file during a session. The details of the modification (such as timestamp and user ID) can initially be stored in the session portion for quick access. However, as the session progresses, this information can be periodically transferred to the persistent portion to guarantee that it is not lost if the system restarts unexpectedly. Additionally, if a system is undergoing a scheduled shutdown, the system can migrate relevant data from the session portion to the persistent portion before the shutdown, guaranteeing that all important information is preserved. Upon restart, the system can then use the persistent portion to restore the state of certain files or processes, while the session portion resets to handle new data for the current session.

Accordingly, the PFC comprises a local storage mechanism that tracks file modifications and stores validated file information across sessions.

In one embodiment, the persistent cache portion is valid after any number of system restarts. In another embodiment, the persistent cache portion is valid after a certain number of system restarts (e.g. a quota), then invalidates after the quota.

In an embodiment, EDR manager 110 can provide rules for session storage and persistent cache portion storage to optimize persistent cache 126 (as implemented by, for example, cache logic engine 128). For example, the data stored in the persistent cache portion can be minimized to reduce storage obligations of computing device 104. In an embodiment, only portions of the data stored in the persistent cache portion are replaced instead of storage of entire updated copies.

Cache logic engine 128 is configured to support persistent cache 126 operations. For example, cache logic engine 128 can read from and write to persistent cache 126 according to certain logic. In an embodiment, cache logic engine 128 is utilized to store and compare the particular values in persistent cache 126 for the persistent file protection embodiment implemented by cyber protection service 102.

Cache logic engine 128 can implement persistent cache storage based on one or more storage rules. The storage rules can include at least one of mask rules, importance rules, or directory rules. These rules allow the system to selectively log call information based on predefined criteria, optimizing storage and processing efficiency.

Mask rules can specify which parts of data should be stored and which parts can be skipped. For example, mask rules can specify that only registry call information related to security settings or critical system configurations is logged, while routine or non-essential registry call information is excluded from storage. As another example, mask rules can include techniques used to obfuscate, anonymize, or redact sensitive data to protect it from unauthorized access. In another example, importance values can be provided for certain data sources or certain data to store relatively more important data than less important data. For example, "high" importance data can be stored instead of "low" importance data. In another example, data from certain directories can be prioritized. Directory storage rules policies for replicating data from EDR driver 122 source to persistent cache 126 based on directory information.

In an embodiment, cache logic engine 128 can expand persistent cache 126 to include metadata about the cloud-based slices. This allows the system to store and track information about which slices contain specific extents, further improving the efficiency of file recovery. For example, the memory size of persistent cache 126 can be increased. In an embodiment, when local storage quotas are exceeded, cache logic engine 128 determines which data should be deleted from persistent cache 126 and retrieves the necessary information from cloud slices instead. For example, persistent cache 126 may have a limit on its size or portions of its size as a quota.

In an embodiment, the initial validation of the PFC involves identifying the last set of existing slices and validating the files based on their integrity within these slices. To achieve this, the system mounts the relevant slice using a mounter tool (e.g. archive mounting service 142 with archive mount driver 146, as will be described), extracting extents and analyzing their correspondence with existing data. In an embodiment, integrity evaluation includes retrieving the topology and hashes of the file extents from the slice and comparing them to the PFC-stored data.

The system uses a copy-on-write mechanism, ensuring that only modified clusters or sectors of extents are flagged in the PFC. For every extent stored in the PFC, a map of modified clusters or sectors is maintained. When a specific sector of an extent is modified, the PFC logs the change, eliminating the need to copy unmodified data locally. During file recovery, only the flagged extents or sectors are retrieved from the cloud slices, significantly reducing data transfer overhead.

If full validation is required, the system mounts the entire slice, enumerates the file extents, and compares the file extents hashes and topology against both local and cloud-stored data. For optimal performance, this process can be integrated with the backup workflow, such as during post-backup routines or scheduled scans of the backup archives. These workflows can calculate and store hashes in the PFC during non-critical operations, minimizing performance impact during real-time protection activities.

The concept of topology in the PFC refers to the mapping of file extents, including their start and end positions, locations, and associated hash values. These parameters allow the system to efficiently track and validate data consistency during file recovery processes. By comparing the topology stored in the PFC with the topology retrieved from a mounted cloud slice, the system can confirm whether the extents align correctly. In one aspect, comparing topology includes mounting the relevant slice, extracting the target file's extents, and validating these extents against the PFC metadata. Such a comparison guarantees that the reconstructed file remains accurate and adheres to its pre-incident state.

Additionally, the use of topology enables scalability in storage and recovery operations. Since the PFC primarily retains metadata rather than actual file data, it facilitates the tracking of extents across an unlimited number of cloud-based slices. This approach reduces system load and improves recovery efficiency, particularly in scenarios involving untrusted processes or potential attacks.

In scenarios where zero-day attacks or suspicious file modifications are detected, the system operates with markers that reference the cloud backups. These markers ensure rapid identification of the affected sectors without requiring full copy-on-write snapshotting. By focusing on relevant extents, the system balances real-time protection with efficient resource utilization.

File protector driver 130 operates at kernel mode 108 level to implement remediation handler 124 kernel operation and/or cache logic engine 128 operations. For example, as discussed above, certain remediation handler 124 operations use kernel-level operations, such as file system and network socket handling. In another example, file protector driver 130 can implement or retrieve kernel-level data related to information stored in persistent cache 126.

In an embodiment, file protector driver 130 facilitates interaction with the PFC by managing file modification tracking and ensuring data integrity. When an untrusted process or thread begins modifying a file, file protector driver 130 captures this event and extracts information about the file. At the initial access to the file, a map of its extents is saved in the PFC. Subsequently, based on whether this information exists in the PFC (e.g., from prior archive scans), the driver marks modified portions of the file's extents for tracking purposes.

In addition to marking modified pieces of extents, file protector driver 130 supports ransomware detection by transferring data to a server for heuristic analysis. This enables early identification of suspicious activity patterns, such as ransomware behavior. Furthermore, file protector driver 130 coordinates between the local system and cloud storage, ensuring that either the modified data itself or metadata about cloud-stored data is appropriately managed within the PFC. For example, if necessary extents are unavailable locally, file protector driver 130 initiates retrieval from the cloud slices.

In one aspect, file protector driver 130 can trigger notifications about file deletions or other changes. In one aspect, file protector driver 130 can request data from persistent cache 126 (via cache logic engine 128). In an embodiment, file protector driver 130 can itself mount cloud slices to retrieve necessary extents.

In one aspect, file protector driver 130 provides real-time responsiveness by mapping modified extents and providing this information for use during file restoration. During restoration, the driver enables efficient recovery by referencing the PFC-stored information about modified extents, eliminating redundant retrievals of unmodified data.

In one aspect, file protector driver 130 is configured to scan the local file system of computing device 104 to determine if the necessary file extents (e.g. to recover a given file) can be found locally. If extents are unavailable locally, file protector driver 130 can integrate with archive services to mount cloud slices, extract required extents, and validate the retrieved data using hashes or other integrity checks.

In one aspect, file protector driver 130 can conduct post-recovery monitoring, in which integrity of the restored files is checked. For example, file protector driver 130 can compare the reconstructed file against known references, such as the file stored in the last cloud-based slice to determine if the reconstructed file is the same (or substantially the same, in embodiments).

Archive mounting service 142 comprises a user-level engine configured to coordinate mounting of slices from cloud-based storage as local volumes. In an embodiment, archive mounting service 142 can utilize a kernel-mode driver (e.g. archive mount driver 146) for mounting. In an embodiment, archive mounting service 142 can tailor the mounted slice according to a specific API (e.g. via archive API 144) based on the type of file system or type of backup.

Archive mount driver 146 comprises a kernel-mode driver for mounting slices as local volumes.

In one aspect, archive mounting service 142 and archive mount driver 146 can mount the last backup slice before the incident as a local volume in system background without blocking other system operations. More particularly, the last backup slice is mounted on computing device 104 background (such as by a computer program that does not create a user interface, or a Windows service) without blocking other processes of computing device 104.

Archive mounting service 142 is responsible for interacting with cloud-based archives to identify and extract the necessary backup slices for mounting. Archive mounting service 142 facilitates communication with the archive system (e.g. cloud archive 150), ensuring that the required data is retrieved efficiently and securely. Archive mounting service 142 oversees the process of determining which slices need to be accessed based on the file recovery requirements and coordinates with other system components, such as archive verifier 140, to ensure data integrity.

Archive mount driver 146, on the other hand, operates at the kernel level to instantiate a virtual disk environment. Once the archive mounting service identifies the relevant slice, the driver initializes the virtual disk and populates its sectors with data retrieved from the cloud archive. This allows the system to interact with the mounted slice as if it were a local disk, enabling seamless access to file data without requiring specialized parsers or additional processing.

Archive API 144 is configured to format a mounted slice according to the file system of computing device 104. In one aspect, archive API 144 is further configured to package a given backup into slices for cloud-based storage.

Archive API 144 orchestrates the process of mounting specific backup slices by issuing commands to initiate the mounting operation. Once a slice is mounted, Archive API 144 ensures that the mounted slice is formatted appropriately to match the file system of computing device 104, allowing seamless integration and access to the data stored in the slice.

In addition to formatting, archive API 144 performs verification and comparison of file extents to ensure data integrity. Archive API 144 can communicate with archive verifier 140 to validate the extents retrieved from the mounted slice against pre-stored metadata, such as hashes or topological information, ensuring that the recovered data aligns with the original backup.

By acting as a bridge between the cloud storage system (cloud archive 150) and the local environment, archive API 144 facilitates both the packaging of data into slices for cloud-based storage and the subsequent retrieval and validation of these slices during recovery operations.

Local archive 148 comprises a locally-mounted slice after mounting by archive mounting service 142 (and archive mount driver 146, as needed), as formatted by archive API 144.

Archive verifier 140 is configured to access one or more cloud-based backups, retrieve one or more backup slices, and verify file integrity through selective comparisons. In one aspect, archive verifier 140 is configured to identify relevant slices from cloud backups and instruct archive mounting service 142/archive mound driver 146 to mount the relevant slices as local volumes. In an embodiment, archive verifier 140 can operate on backup archive date metadata (e.g. timestamp) such that archive verifier 140 can determine which backup archive is "most recent" in time. In one aspect, "most recent" refers to a single backup archive. In one aspect, "most recent" refers to two or more most recent archives.

Archive verifier 140 operates as a critical component that ensures the integrity and validity of file slices during recovery. Archive verifier 140 is configured to access the most recent cloud-based backup (e.g. single most recent backup in time to the current time) and retrieve a set of backup slices from the archive. Using metadata and stored hashes, archive verifier 140 validates the slices by selectively comparing file extents retrieved from the mounted slices against pre-incident file data stored in the persistent file cache (PFC).

In one aspect, archive verifier 140 directs the mounting of the last backup slice, determines the file extents from the mounted slice, and computes their hashes. These hashes are then compared to the corresponding pre-incident file extent hashes. If the hashes match, the backup slice is deemed valid, and the relevant extents are used to restore the file.

If discrepancies are detected during the hash comparison, archive verifier 140 dynamically searches for alternative backup slices within the same archive or across multiple archives. This search leverages metadata that details the contents and extents of each slice, ensuring that missing or corrupted data can be located and validated effectively.

In addition to its validation role, archive verifier 140 integrates with the archive mounting service to optimize slice access. By coordinating the mounting process and ensuring that slices are only retrieved when necessary, archive verifier 140 minimizes data transfer overhead and accelerates recovery. Archive verifier 140 ability can thus validate data selectively at the extent level rather than the file level and further improves efficiency.

In one aspect, when the hash of the at least one file extent does not match the pre-incident file extent hash as a mismatch, cache logic engine 128 is further configured to change tracking of file changes according to the mismatch.

If a mismatch is detected during hash validation, cache logic engine 128 initiates a process to reassess the tracking of file changes. Reassessing tracking can include scanning through available slices in the archive, both older and newer, to identify a valid copy of the file extent. By leveraging metadata stored in the PFC, cache logic engine 128 can prioritize slices based on their temporal proximity to the pre-incident state, ensuring that the most accurate recovery point is used.

When an older slice is identified as valid, cache logic engine 128 adjusts its tracking to reflect the state of the file at that point in time. Conversely, if a newer slice provides a match, the tracking is updated to incorporate changes captured in that slice. This dynamic adjustment allows the system to reconcile discrepancies and ensure that the most reliable data is used for recovery.

Additionally, cache logic engine 128 can flag the affected file extents as requiring further monitoring. These flags ensure that subsequent modifications are carefully tracked and validated, reducing the risk of perpetuating errors or incorporating corrupted data into the recovery process.

In one aspect, in the case where a persistent storage quota is exceeded, archive verifier 140 is configured to create a new slice for storage on cloud-based storage.

Cloud archive 150 comprises cloud-based storage. In an embodiment, cloud archive 150 comprises a plurality of backup data in the form of cloud-stored file segments. As illustrated, cloud archive 150 comprises file segments first slice 152, second slice 154, and third slice 156. In one aspect, first slice 152, second slice 154, and third slice 156 can be associated with the same file. In another aspect, first slice 152, second slice 154, and third slice 156 can be associated with different files.

In an embodiment, EDR manager 110 is further configured to pass a policy to system components based on the incident. For example, when creating or otherwise determining an incident, EDR manager 110 can define certain data handling, including retrieval (e.g. from EDR driver 122), communication (e.g. via IPC engine 112), behavior analysis and scanning (e.g. via behavior engine 114 and scan engine 116), or remediation (e.g. via remediation engine 118). Accordingly, data handling can be incident-specific or file-specific.

In one aspect, persistent cache 126 can communicate only meta-data related to the data stored in the persistent cache portion of persistent cache 126 to EDR manager 110, such as data related to the snapshots, maps, or files. In another aspect, the data from persistent cache 126 can be communicated to EDR manager 110 (such as via cache logic engine 128 to IPC engine 112).

Figure 2:
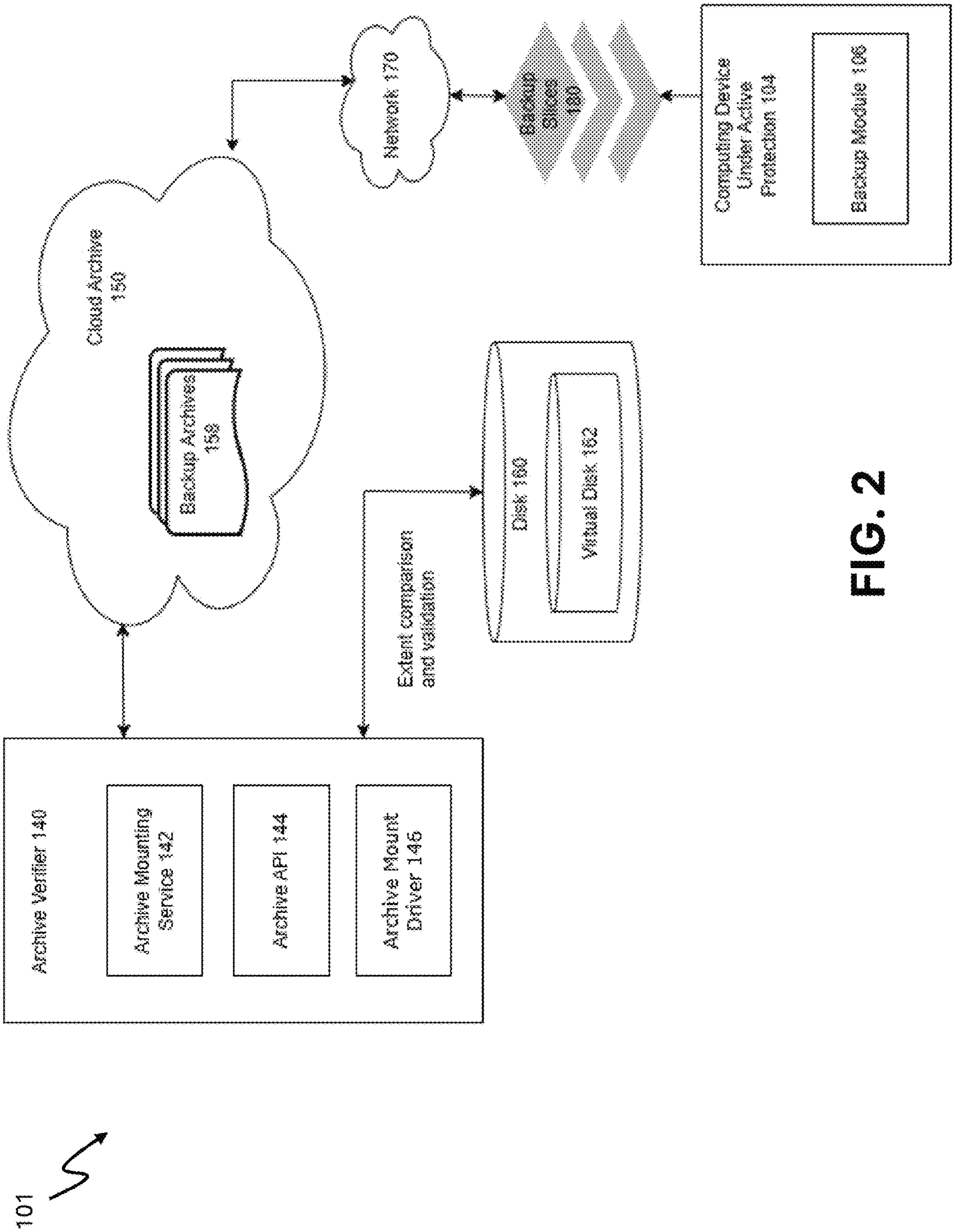
FIG. 2 is a block diagram of a system for persistent file protection, according to an embodiment.

Referring to FIG. 2, a block diagram of a system 101 for persistent file protection, according to an embodiment. As illustrated, system 101 comprises certain components in common with system 100, which are not redescribed here for simplicity. In general, system 101 comprises archive verifier 140, cloud archive 150, disk 160, network 170, and backup slices 180.

As illustrated in FIG. 2, archive verifier 140 itself comprises archive mounting service 142, archive API 144, and archive mount driver 146. Archive verifier 140 is operably coupled to cloud archive 150.

In system 101, cloud archive 150 comprises a plurality of backup archives 158. Each backup archive 158 can comprise one or more backup slices.

As further illustrated, archive verifier 140 is operably coupled to disk 160 for extent comparison and validation. Disk 160 comprises physical storage on which a virtual disk 162 can be mounted (such as a backup slice). A slice comprises a disk image containing a snapshot of the file system at a particular point in time. When the file system from the slice is mounted on the virtual disk, it becomes accessible as a fully functional file system, enabling the retrieval and manipulation of individual files and their associated metadata.

Once mounted, the virtual disk provides visibility into the file system's structure and contents, including the locations of specific files and extents within the slice. This allows for efficient comparison and validation of file extents by archive verifier 140, ensuring that the retrieved data matches the pre-incident state stored in the PFC.

The slice-based architecture of the archive ensures modularity, as each slice encapsulates a specific time-stamped snapshot of the file system. This modularity facilitates granular recovery operations by allowing individual slices to be mounted and validated without affecting the integrity of other slices in the archive.

Computing device 104 is further depicted in FIG. 1 as including a backup module 106. Backup module 106 comprises instructions to generate a backup of computing device 104. In an embodiment, backup module 106 further comprises instructions to generate a plurality of backup slices 180.

Network 170 operably connects computing device 104 and cloud archive 150 for communication of backup data. In an embodiment, network 170 can comprise a Personal Area Network (PAN), Local Area Network (LAN), Campus Area Network (CAN), Metropolitan Area Network (MAN), or Wide Area Network (WAN).

Figure 3:
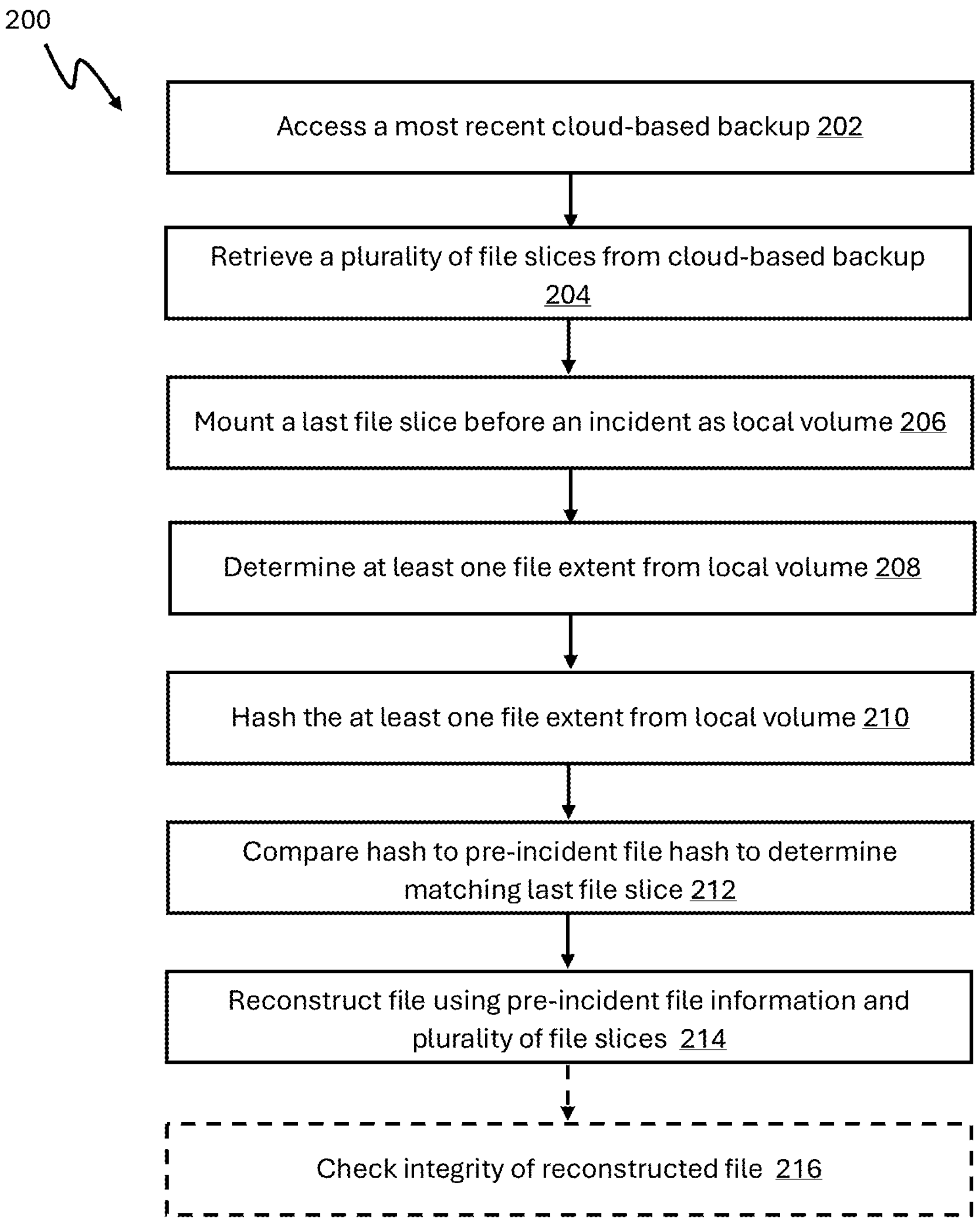
FIG. 3 is a flowchart of a method for persistent file protection, according to an embodiment.

Referring to FIG. 3, a flowchart of a method 200 for persistent file protection is depicted, according to an embodiment. Method 200 can be implemented by the systems described herein, such as systems 100/101 and can be responsive to an incident. Reference is made herein to system 100 for ease of explanation.

Though not depicted in FIG. 3, method 200 can comprise, prior to the illustrated operations, detection of an incident. For example, EDR manager 110, in coordination with EDR driver 122 (and other cyber protection service 102 components as described and considered herein), detect an incident on computing device 104 for a given file. Upon detecting an incident, cache logic engine 128 leverages persistent cache 126 to validate the most recent state of the affected files and affected file extents that can be stored in persistent cache 126. Further, the local file system is scanned to determine if the necessary file extents can be found locally (e.g. by file protector driver 130).

When the necessary file extents cannot be found locally, method 200 is further executed to implement cloud-based verification (for further recovery if needed) if the necessary file extents are missing locally (e.g. due to a quota issue or deletion). In one aspect, validation of cloud slices occurs in the background, so that system 100 continues tracking file activity based on local cache data. This allows system 100 to operate without significant performance degradation during the recovery process.

At 202, a most recent cloud backup is accessed. For example, cache logic engine 128 checks persistent cache 126 to retrieve the timestamp of the last known file modification. As will be described, the timestamp can be matched with cloud-based slices to find the closest backup slice predating the incident (e.g. at 204). Accordingly, in one aspect, at 202, archive verifier 140 can access cloud archive 150 with persistent cache 126 timestamp data.

At 204, a plurality of backup slices from the most recent cloud-based backup archive is retrieved. In one aspect, archive verifier 140 can scan cloud backups and identify the closest backup slice predating the incident (backup segment) stored in cloud archive 150. In one aspect, archive verifier 140 can match persistent cache 126 timestamp data to the relevant closest backup slice (e.g. the most recent backup slice before the timestamp). In one example, archive verifier 140 can scan all cloud backups, identifying a most recent slice by linear or binary search. In another example, archive verifier 140 can selectively scan cloud backups until a most recent slice is determined (e.g. according to known backup rules—such as to account for frequency and depth of backup).

At 206, the closest backup (e.g. the last backup slice before the incident from the plurality of backup slices) is mounted as a local volume. For example, archive mount driver 146, a kernel-level driver, can be used to mount the cloud slice as a local volume. In one aspect, archive mounting service 142 and archive mount driver 146 handle the actual mounting of the cloud slices. In one aspect, the mounted slice is mounted as a read-only virtual disk, so that no changes are made during the validation and recovery process.

At 208, at least one file extent from the local volume is determined. For example, archive verifier 140 can retrieve the file extents that need to be recovered. The determination of these extents is based on information stored in the PFC, which tracks changes to files and their associated extents over time. The PFC contains metadata that identifies which fragments of a file have been modified, providing a map of the affected regions.

At 210, the at least one file extent from the local volume is hashed. In one aspect, a hash-based comparison between the extents in the cloud slice and the extents stored in the PFC is conducted. For example, archive verifier 140 confirms the validity of the extents through hash checks. Accordingly, a first value of the hashed file extent from the local volume is made.

At 212, the hash of the file extent from the local volume is compared to the pre-incident file extent hash to identify matching extents between the last backup slice and the pre-incident file. If the hashes do not match, alternative extents are searched for in the plurality of backup slices, guided by metadata stored in the PFC.

At 214, the file is reconstructed using unaltered file extents and the plurality of cloud-based extents or extents stored in the PFC. For example, remediation handler 124 implements selective extent restoration. In one aspect, method 200 avoids full file recovery, opting instead for differential restoration. Accordingly, in general, method 200 selectively retrieves only those extents from the mounted cloud slice that have been modified or corrupted, based on the hash comparison results. In particular, unaltered file extents retained in local volume are combined with the validated cloud-based extents or extents stored in the PFC to reconstruct the file.

The reconstruction process includes combining unaltered and altered file extents systematically. In particular, unaltered file extents are directly retrieved from the local disk or local volume. Unaltered extents are identified based on the metadata map maintained in the PFC, which indicates which parts of the file remain unmodified. Altered file extents, which are flagged as modified, are either retrieved from the PFC if cached locally or from the cloud-based backup slices. Altered extents are validated against their hashes to ensure integrity before being incorporated into the reconstructed file.

The reconstruction process occurs at a low level, where data from unaltered extents is extracted directly from the local volume, while altered extents are fetched and validated from cloud-based slices or the PFC. This approach ensures that only necessary data is retrieved, reducing overhead and accelerating the restoration process.

Once the file is reconstructed, the original altered file on the local system can be deleted, but its metadata and map are retained in the PFC. This map guarantees that the system tracks which parts of the file were modified and provides a reference for subsequent operations.

Further at 214, after final file reconstruction, the file is integrated with the local system. For example, after validating the extents from both local and cloud sources, method 200 reconstructs the file using a combination of data from the PFC and the cloud-based archive slices. Remediation handler 124 finalizes the file recovery or remediation by alerting the file system.

If persistent storage quotas are exceeded during this process, archive verifier 140 can proactively initiate the creation of a new slice. Creation of a new slice is an optimization rather than a real-time reaction. Embodiments monitor the available free space for local storage, and when the free space drops below a predefined threshold, a push notification is triggered to prompt the creation of a new backup slice.

This proactive approach ensures that sufficient storage is maintained for future operations and prevents disruptions in the system's ability to handle file modifications or validations. By generating the new slice in advance, the system avoids delays that could occur during critical operations, enabling continuous protection and recovery capabilities.

The creation of anew slice can follow a prioritized workflow. For instance, the system may allocate resources to generate the slice as quickly as possible or in an optimized sequence, ensuring minimal impact on ongoing processes. This flexibility allows the system to balance performance and storage efficiency, maintaining robust data management and recovery functionality.

Optionally at 216, the integrity of the reconstructed file at 214 is checked. In one aspect, method 200 enters a post-recovery monitoring phase where the integrity of the restored files is checked. For example, file protector driver 130 can conduct post-recovery monitoring. In an embodiment, the integrity can be continuously checked for a period of time. In another embodiment, the integrity is periodically checked. Persistent cache 126 (specifically, the persistent file cache portion) is updated to reflect the new file states, and any future changes are monitored to prevent further data loss or corruption.

Post-recovery monitoring can include comparing the reconstructed file against known references, such as the file stored in the last cloud-based slice. Comparing the reconstructed file against known references ensures that the reconstructed file remains consistent with its validated pre-incident state. However, recognizing that the file may have been modified locally after the last recorded backup, the system performs validation based on consistent and untouched extents rather than assuming full alignment with the last backup.

The system leverages the PFC, which contains a complete map of hashes for all file fragments, to validate the file. By comparing the hashes of reconstructed file fragments with those stored in the PFC, the system ensures that the restoration process adhered to the original reconstruction plan. If discrepancies are detected, the system flags the file for further review and attempts to reconcile inconsistencies by referencing consistent fragments from cloud slices.

If the reconstructed file fails validation and inconsistencies persist, a fallback mechanism is employed. This mechanism involves retrieving the entire file from the most recent backup slice and using it as the restored version. While less optimal, this ensures that a functional version of the file is recovered, even in scenarios where local validation fails.

This approach balances efficiency and reliability by utilizing authentic, unaltered fragments wherever possible, supplemented by fallback mechanisms to handle edge cases. The monitoring phase helps identify issues early, ensuring data consistency and reducing the risk of undetected corruption.

Figure 4:
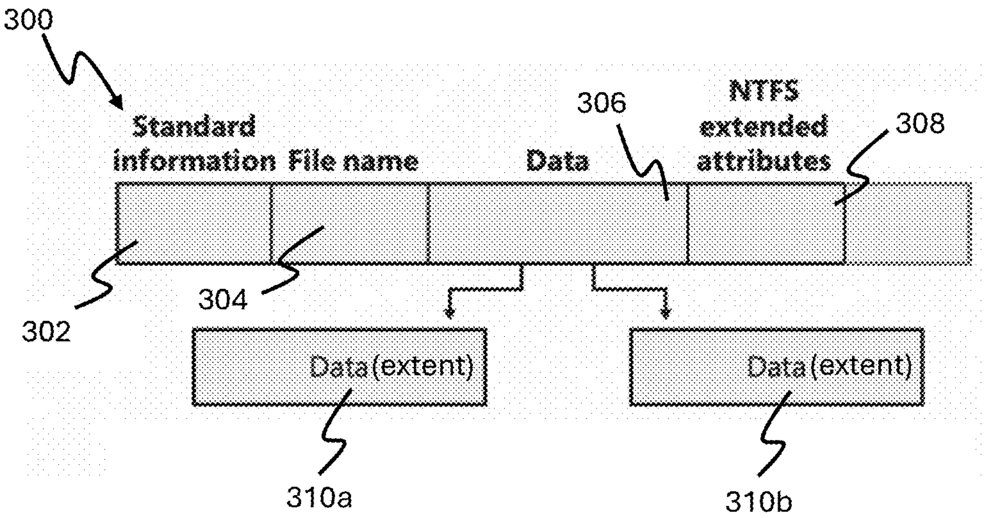
FIG. 4 is a block diagram of a master file table for a file with two data runs, according to an embodiment.

Referring to FIG. 4, a block diagram of a master file table (MFT) 300 for a file with two data runs, according to an embodiment. Master file table 300 comprises standard information 302 and file name 304, NTFS extended attributes 308, which can comprise various optional extensions such as quotas, reparse point data, and object identifiers. With respect to data 306, as illustrated, two extents **310*a* and 310*b* are depicted. In an example, master file table 300 can be the MFT for computing device 104. In one aspect, a file protector driver can scan the local file system (e.g. extents 310*a* and 310*b*) to determine if the necessary file extents can be found locally. In one aspect, hashes for extents 310*a* and/or 310*b* can be stored in persistent cache 126. In an example, master file table 300 can be instantiated according to the mounting of a valid backup slice as a local volume such that extents 310*a* and 310*b*** are the cloud-stored extents.

In an optimization, systems and methods are optimized to operate across various file systems (e.g., New Technology File System (NTFS), File Allocation Table (FAT), Resilient File System (ReFS)). In cases where block-level comparison (instead of hash validation) is necessary, systems and methods adjust validation strategy based on the granularity of the file system used. In examples, different platforms such as WINDOWS, LINUX, and MACOS have different file system mechanisms (e.g., NTFS in WINDOWS, differing from LINUX and MACOS), the approach of using file extent retrieval through system-specific APIs remains consistent.

LINUX and MACOS have analogous commands and tools for extent retrieval, allowing for similar implementation strategies across platforms. Accordingly, embodiments can adjust how extents are managed and retrieved, but the overall approach of differential recovery and extent validation remains the same.

For example, the fiemap ioctl in LINUX is an efficient method for userspace to get file extent mappings. An ioctl provides a way for user-space programs to communicate with device drivers in the kernel to perform actions beyond standard system calls. A fiemap is an ioctl that retrieves the physical extent map of a file, showing how the logical file offsets map to physical disk blocks. Instead of block-by-block mapping (such as bmap), fiemap returns a list of extents. An exemplary fiemap request is encoded within struct fiemap as shown below:

```
struct fiemap {
        __u64 fm_start;         /*
                                logical offset (inclusive) at
                                which to start mapping (in)
                                */
        __u64 fm_length;        /*
                                logical length of mapping which
                                userspace cares about (in)
                                */
        __u32 fm_flags;         // FIEMAP_FLAG_* flags for request (in/out)
        __u32 fm_mapped_extents; /*
                                       number of extents that were mapped
(out)
                                       /*
        __u32 fm_extent_count;  // size of fm_extents array (in)
        ___u32 fm_reserved;
        struct fiemap_extent fm_extents[0]; // array of mapped extents (out)
}
```

Other fiemap requests may also be used, consistent with the disclosure above.

The fiemap ioctl structure facilitates efficient file extent mapping by enabling userspace programs to request logical-to-physical file offset information from the kernel. The fm_start and fm_length fields define the logical range of the file to be mapped, where fm_start specifies the starting offset, and fm_length defines the range's length. This allows for targeted mapping of only the relevant portions of a file. The fm_flags field allows for additional control through predefined flags (e.g., FIEMAP_FLAG_SYNC), indicating specific mapping behaviors. The fm_mapped_extents field indicates how many extents were successfully mapped in response to the request, while fm_extent_count specifies the size of the fm_extents array. The fm_extents array holds the actual extent information, where each entry describes a range of logical file offsets and their corresponding physical disk block locations. By utilizing this mapping system, the archive verifier or cache logic engine can efficiently track and manage extents during file recovery, so that extent locations correspond to metadata stored in the Persistent File Cache (PFC). This process minimizes unnecessary data transfers and enables precise restoration of modified or missing file segments.

The invention claimed is:

1. A system for persistent file protection for an incident for a file, comprising:

a persistent file cache (PFC) configured to track file changes and store validated pre-incident file information across system restart, the validated pre-incident file information including a pre-incident file extent hash;

a memory and at least one processor operably coupled to the memory; and instructions that, when executed by the at least one processor, cause the at least one processor to implement:

an archive verifier configured to:

access a cloud-based backup archive and retrieve recent backup slices from the cloud-based backup archive, mount a last backup slice before the incident from the recent backup slices as a local volume using an archive mount driver, determine at least one file extent from the local volume, hash the at least one file extent, and compare the hash of the at least one file extent to the pre-incident file extent hash to identify matching extents between the last backup slice and the pre-incident file including by determining at least a start, an end, and a location of the at least one file extent from the local volume and compare the start, end, and location to the validated pre-incident file information, the validated pre-incident file information further comprising a pre-incident start, a pre-incident end, and a pre-incident location of the file;

a remediation handler configured to reconstruct the file as a reconstructed file by combining unaltered file extents retrieved from the local volume with extents stored in the PFC or validated extents from the backup slices from the cloud-based backup archive.

2. The system of claim 1, wherein the archive verifier comprises a kernel-level driver configured to mount the last backup slice as a local volume comprising a read-only virtual disk.

3. The system of claim 1, wherein the instructions that, when executed by the at least one processor, cause the at least one processor to further implement:

a cache logic engine configured to expand the PFC to include metadata about the recent backup slices including which of the recent backup slices contain specific extents.

4. The system of claim 1, wherein the instructions, when executed by the at least one processor, cause the at least one processor to further implement:

a cache logic engine configured to delete the validated pre-incident file information from the PFC when a local storage quota is exceeded.

5. The system of claim 1, wherein the instructions, when executed by the at least one processor, cause the at least one processor to further implement:

when the hash of the at least one file extent does not match the pre-incident file hash, searching for alternative backup slices in the recent backup slices using the metadata about the recent backup slices including which of the recent backup slices contain specific extents.

6. The system of claim 5, wherein when the hash of the at least one file extent does not match the pre-incident file hash as a mismatch, the PFC is further configured to change tracking of file changes according to the mismatch.

7. The system of claim 1, wherein mounting the last backup slice before the incident from the plurality of backup slices as the local volume is executed on a computing device without blocking other computing device operations.

8. The system of claim 1, wherein the remediation handler is configured to reconstruct the file using the pre-incident file information and the plurality of backup slices including by selectively retrieving file extents from the mounted local volume that have been modified based on the comparing of the hash of the at least one file extent to the pre-incident file extent hash.

9. A method of persistent file protection for an incident for a file using a persistent file cache (PFC) configured to track file changes and store validated pre-incident file information across system restart, the validated pre-incident file information including a pre-incident file extent hash, the method comprising:

retrieving a plurality of backup slices from a most recent cloud-based backup archive;

mounting a last backup slice before the incident from the plurality of backup slices as a local volume;

determining at least one file extent from the local volume;

hashing the at least one file extent;

comparing the hash of the at least one file extent to the pre-incident file extent hash to identify matching extents between the last backup slice and the pre-incident file including by determining at least a start, an end, and a location of the at least one file extent from the local volume and compare the start, end, and location to the validated pre-incident file information, the validated pre-incident file information further comprising a pre-incident start, a pre-incident end, and a pre-incident location of the file; and reconstructing the file as a reconstructed file using the pre-incident file information by combining unaltered file extents retrieved from the local volume with extents stored in PFC or validated extents from the plurality of backup slices.

10. The method of claim 9, wherein the last backup slice is mounted as a local volume comprising a read-only virtual disk by a kernel-level driver.

11. The method of claim 9, further comprising:

expanding the PFC to include metadata about the plurality of backup slices including which of the plurality of backup slices contain specific extents.

12. The method of claim 9, further comprising:

deleting the validated pre-incident file information from the PFC when a local storage quota is exceeded.

13. The method of claim 9, further comprising:

when the hash of the at least one file extent does not match the pre-incident file hash, searching for alternative backup slices in the plurality of backup slices using the metadata about the plurality of backup slices including which of the plurality of backup slices contain specific extents.

14. The method of claim 13, wherein when the hash of the at least one file extent does not match the pre-incident file hash as a mismatch, changing tracking of file changes according to the mismatch in the PFC.

15. The method of claim 9, wherein mounting the last backup slice before the incident from the plurality of backup slices as the local volume is executed in system background without blocking other system operations.

16. The method of claim 9, wherein reconstructing the file using the pre-incident file information and the plurality of backup slices includes selectively retrieving file extents from the mounted local volume that have been modified based on the comparing of the hash of the at least one file extent to the pre-incident file extent hash.

17. A system for persistent file protection, comprising:

computing hardware including at least one processor and memory operably coupled to the at least one processor;

a cloud-based backup device comprising storage for a plurality of backup slices for a computing device backup;

kernel-mode computing device instructions that, when executed by the at least one processor, cause the kernel-mode computing device instructions to:

retrieve a plurality of backup slices from a most recent cloud-based backup archive, mount a last backup slice before the incident from the plurality of backup slices as a local volume, determine at least one file extent from the local volume, hash the at least one file extent, compare the hash of the at least one file extent to a pre-incident file extent hash to identify matching extents between the last backup slice and the pre-incident file including by determining at least a start, an end, and a location of the at least one file extent from the local volume and compare the start, end, and location to validated pre-incident file information, the validated pre-incident file information further comprising a pre-incident start, a pre-incident end, and a pre-incident location of the file; and user-mode computing device instructions that, when executed when executed by at least one processor, cause the user-mode computing device instructions to:

reconstruct the file as a reconstructed file using by combining unaltered file extents retrieved from the local volume with extents stored in PFC or validated extents from the plurality of backup slices from the most recent cloud-based backup archive.

18. The system of claim 17, wherein the kernel-mode computing device instructions to mount the last backup slice before the incident from the plurality of backup slices as the local volume are executed in system background to not block other operations while the last backup slice is mounted.

19. The system of claim 2, wherein the kernel-level driver is further configured to initialize the read-only virtual disk and populate one or more sectors of the read-only virtual disk with data retrieved from the last backup slice.

20. The method of claim 10, further comprising:

initializing the read-only virtual disk; and populating one or more sectors of the read-only virtual disk with data retrieved from the last backup slice.

* * * * *